United States Patent Office 3,208,368
Patented Sept. 28, 1965

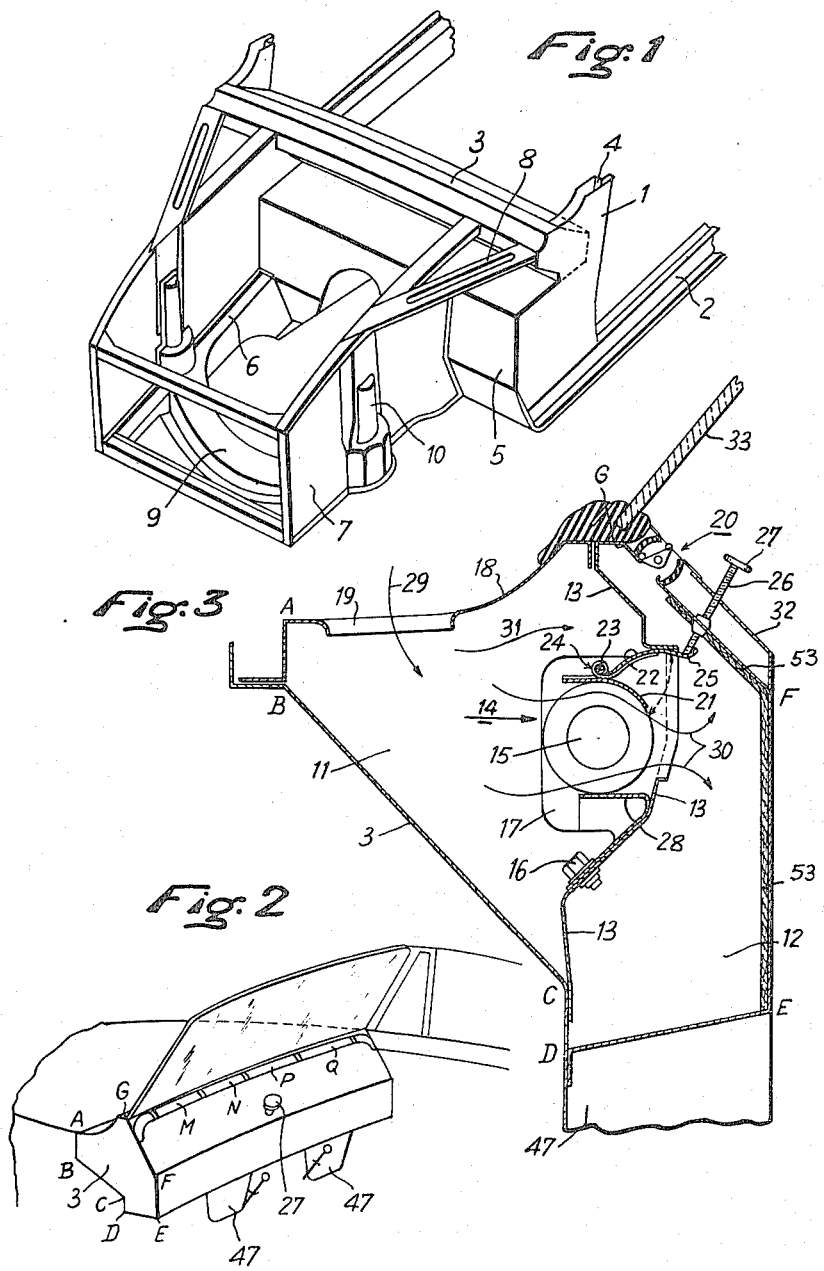

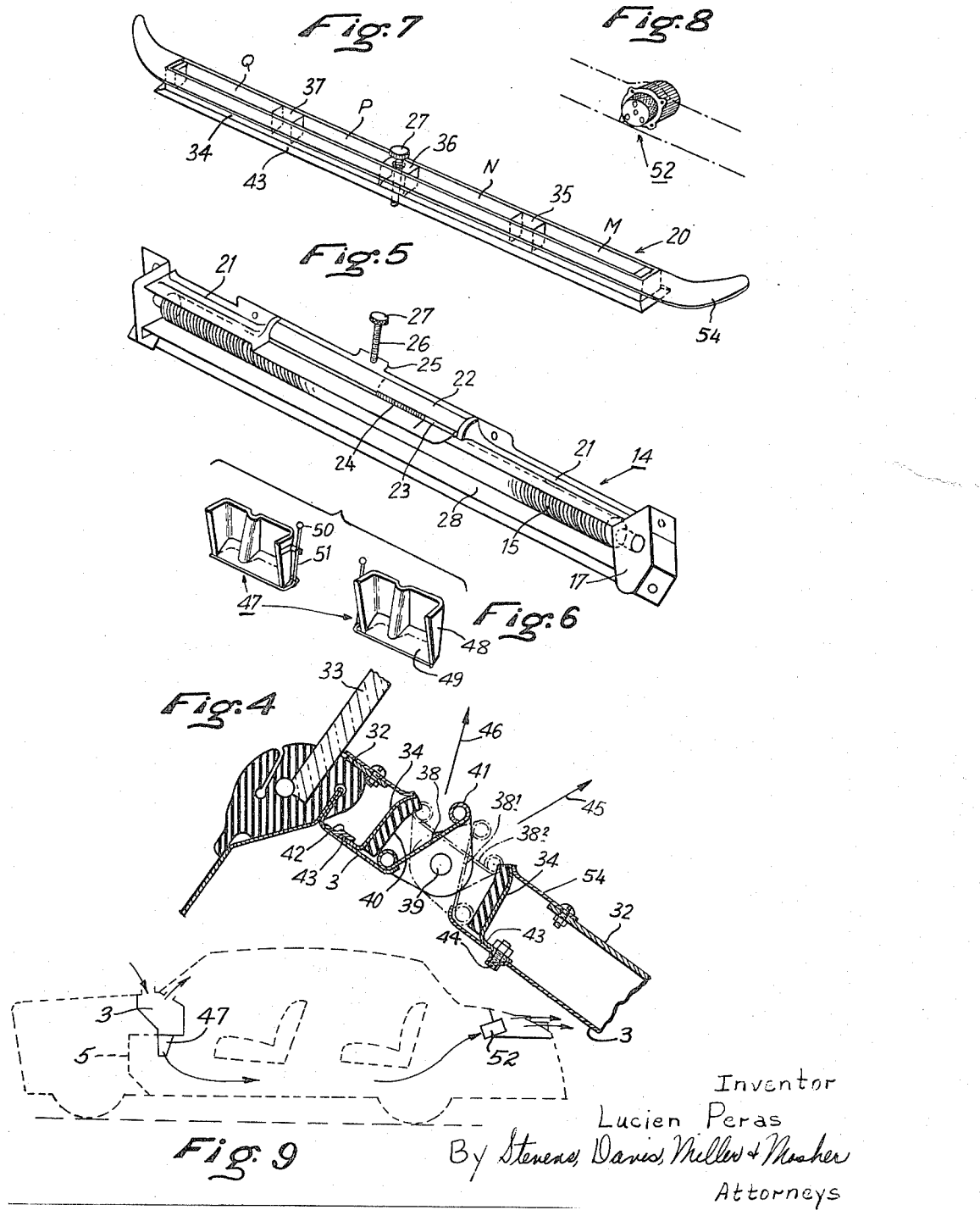

3,208,368
AIR-CONDITIONING SYSTEMS FOR
AUTOMOBILE VEHICLES
Lucien Péras, Billancourt, France, assignor to Regie Nationale des Usines Renault, Billancourt, France
Filed June 19, 1963, Ser. No. 289,131
Claims priority, application France, July 3, 1962,
902,794, Patent 1,339,569
7 Claims. (Cl. 98—2)

This invention relates to air-conditioning systems of automobile vehicles and it is the essential object of this invention to improve the efficiency, reduce the over-all dimensions and facilitate the fitting and removal, of devices of this character.

As a rule, this invention is applicable to all vehicles having (or adapted to receive) a hollow or box-sectioned cross member under the windscreen, this cross member being adapted to carry on one face, or even to constitute, the instrument panel.

Therefore, this invention is concerned notably with certain front structures of automobile frames, in that it provides a front structure characterized in that the elements associated with the front longitudinal members are connected very rigidly with an assembly of cross members comprising notably a horizontal cross member constituting a pressed-sheet hollow beam extending along the lower edge of the windscreen.

It is the object of this invention to provide an air-conditioning system for automobile vehicle wherein most of the component elements are either housed within or secured on the aforesaid hollow cross member or beam.

These component elements are easily detachable (by being fastened for example by screwing on the vehicle body) and of relatively reduced over-all dimensions; they include essentially:

A heater unit;
A demister-ventilation unit;
Two diffusers (a left-hand diffuser and a right-hand diffuser);
A forced-circulation unit.

The heater unit housed within the hollow cross member or beam comprises a radiator consisting of a finned cylindrical element extending throughout the width of said cross member (that is, substantially throughout the width of the vehicle).

The heat thus emitted from a very diffuse source is distributed over a relatively great surface area, thus reducing considerably unpleasant whirlings caused by high-speed air streams. A vertical partition separates the aforesaid hollow cross member or beam into two compartments throughout its length.

Thus, the upper portion of the front compartment thus obtained is an integral part of the bonnet and communicates with the outer atmosphere through fresh-air inlet louvres or like apertures.

The heater unit housed in this front compartment is secured on the aforesaid intermediate partition of the beam. The air issuing from this compartment enters the rear compartment through apertures adjustable by means of shutters providing adequate relative proportions of heated air and cold air.

The demister-ventilation unit mounted at the top of the instrument panel consists essentially of a pressed-sheet element formed with a series of slots communicating with the aforesaid rear compartment, each slot having pivotally mounted therein a separate shutter adapted to be adjusted manually for directing the flow of warm air either toward the windscreen, or toward the roof of the vehicle, or toward the passengers, at will.

The two diffusers mounted on the lower portion of the rear compartment are manually controlled by means of shutters whereby warm air can be directed at will toward the legs of the driver and front passenger.

The forced-circulation unit consisting of a turbine driven from an electromotor is mounted for example on the vertical wall of the rear seat squab. Its function is to draw air from inside the vehicle and to force it to the exterior.

In order to afford a clearer understanding of this invention and to show the manner in which the same may be carried out in practice, a typical form of embodiment of the present invention will now be described, by way of example with reference to the accompanying drawings, in which:

FIGURE 1 is a perspective view showing the front structure of a vehicle body comprising a hollow cross member or beam of the type used in this invention;

FIGURE 2 is another perspective view with parts broken away showing the cross beam of FIG. 1 as seen from the interior of the front portion of an automobile vehicle;

FIGURE 3 is a vertical section taken along the longitudinal center line of the vehicle;

FIGURE 4 is a vertical section showing the demister and ventilation unit;

FIGURES 5 to 8 inclusive are perspective views showing respectively the four main component units of the air-conditioning system of this invention, namely:

FIGURE 5, the heater unit;
FIGURE 6, the two diffusers;
FIGURE 7, the demister and ventilation unit, and
FIGURE 8, the forced-circulation unit.
FIGURE 9 is a schematic of a vehicle showing the location of the units of the invention.

A hollow cross member or beam of the type suitable for carrying out the present invention may form an integral part of a front structure of the frame of an automobile vehicle (see FIGURE 1). This structure comprises two side panels 1 of box-sectioned configuration 4 welded on the lateral longitudinal members 2 and interconnected transversely by the hollow beam 3 and a firewall 5. Furthermore, a pair of front longitudinal members 6 braced by members 9 and two wheel-clearance plates 7 are welded on the hollow beam 3 and firewall 5, the wheel-clearance plates 7 being formed for example with pressed recesses 10 for receiving the front-axle springs and shock-absorbers.

This hollow beam 3 constructed and equipped according to this invention (see FIGS. 2 and 3) and having a cross-section A–B–C–D–E–F–G is divided throughout its length by a substantially vertical partition wall 13 into two compartments namely a front compartment 11 of which the upper portion 18 communicates with the outer atmosphere through air inlet louvres or like apertures 19, and a rear compartment 12 communicating at its top, under the windscreen, through orifices or slots provided in the demister and ventilation unit 20 and at its bottom through adjustable diffusers 47, with the interior of the vehicle.

The heater unit 14 (FIGS. 2 and 5) is housed in the front compartment 11. It comprises a finned cylindrical radiator 15 mounted on a support 17 detachably secured against the aforesaid partition 13, for example by means of bolts 16.

The radiator 15 is disposed between two fixed plates 21, 28 acting as air deflectors or guides. The lower plate 28 extends throughout the length of the radiator and the upper plate 21 through only one fraction of this length. On the radiator portion not covered by this plate 21 (which may if desired be a central portion of the radiator length) the fixed plate 21 is replaced by a shutter 22 pivotally mounted on a pin 23 and constantly urged to its uppermost position by a spring 24. This shutter 22 carries a central lug 25 engageable by the lower or inner end of a threaded shank 26 of a screw adapted to be turned manually by means of its knurled head 27 projecting above the instrument panel of the vehicle.

By turning this knurled head 27 and thus acting against the resistance of the aforesaid return spring 24, the central shutter 22 may be lowered or raised at will.

In its raised position the shutter 22 allows external air sucked through the orifice 19 to penetrate into the compartment 11 in the direction of the arrow 29, this air subsequently flowing through the fins of radiator 15 and becoming heated as it circulates in the direction of the arrows 30, for finally penetrating into the lower compartment 12 from which it is distributed to the desired section of the vehicle interior.

When the shutter 22 is lowered, one fraction of the fresh air flows directly from compartment 11 to compartment 12 in the direction of the arrow 31.

The inclination of shutter 22 will thus permit of adjusting the temperature of the air flow delivered into compartment 12, by proportioning the fresh air taken at 31 from the total fresh air entering the upper compartment 11 in the direction of the arrow 29.

A heat insulating lining 53 is provided on the walls EF and FG of beam 3 for protecting from heat the instrument panel mounted at 32 on wall FG.

The de-mister and ventilation unit 20 (FIGS. 3, 4 and 7) is mounted on the upper portion of the instrument panel 32, under the windscreen 33.

It comprises a pressed-sheet frame structure 34 forming the walls of a series of slots M, N, P, Q separated by bridge pieces 35, 36 and 37. The inner walls of each slot are lined with sheets or pads 40 of very elastic and soft material such as foam rubber.

In each slot M, N, P, Q a shutter 38 formed with a rolled edge 41 is pivotally mounted on a hinge pin 39 rigid with the frame structure 34. Each shutter is adapted to pivot about its hinge pin independently of the other shutters, by simply exerting a manual pressure thereon, and is retained in the thus selected position by the elastic pressure exerted by the lining 40 on the rolled edges 41.

The bottom of the frame structure 34 is formed with a flange or lip 43 fitting under sheet-metal lugs 42 rigid with the beam 3, this flange or lip 43 being on the other hand secured by means of screws 44 on said beam 3. An upper strip 54 separate from the frame structure 34 constitutes an ornamental junction element for connecting this frame structure with the instrument panel 32.

It is clear that in the position of shutter 38 which is shown in thick lines in FIG. 4 the warm air flows through the relevant slot in a direction 45 toward the driver's or passenger's face.

When this shutter is in position $38^1$ shown in chain-dotted lines in FIG. 4 the warm air flows upwards in the direction of the arrow 46 along the inner surface of the windscreen.

On the other hand, in position $38^2$ of this shutter, as also shown in chain-dotted lines in FIG. 4, the slot is closed completely.

The lower diffusers 47 (see FIGS. 2, 3 and 6) consist of pressed-sheet through sections secured on the lower portion of compartment 12 of beam 3.

The lower aperture of each through-like diffuser is likewise controlled by a shutter 49 controlled in turn by a lever or knob 50 acting upon a rod 51, the lever or knob 50 being disposed for example under the instrument panel.

Each diffuser is controlled separately and permits of directing heated air toward the legs of the driver and/or front passenger.

The last unit of the system, that is the forced-circulation ventilator 52 (FIG. 8) is designed for taking air from the interior of the vehicle and forcing this air to the outer atmosphere. This device, mounted in the rearmost position (for example on the vertical wall of the rear seat bed-plate, or under the rear window), consists of a conventional motor and turbine assembly.

Of course, various modifications may be brought to the specific form of embodiment of the invention which is shown and described herein by way of example, without departing from the spirit and scope of the invention as set forth in the appended claims.

I claim:

1. An air conditioning system in combination with an automotive vehicle, said vehicle having front and rear compartments, a vertical firewall separating said compartments and having an opening therein, a cross-member with an upwardly extending wind screen thereon capping said wall, said system comprising an intermediate compartment extending through said opening in said firewall, a cowl located in said front compartment and having openings therein, means dividing said intermediate compartment into forward and rearward sections, said cowl openings placing said forward section in communication with the outer air, first and second duct means mounted in said dividing means to interconnect said forward and rearward sections, heater means mounted in said first duct means, said second duct means being a bypass of said heater, means for controlling the relative proportions of heated and unheated air through each said duct means respectively to said rearward section, said heated and unheated air mixing to a substantially uniform temperature in said rearward section, upper and lower ventilation diffusers in said rearward section, first exhaust deflection means in said upper ventilation diffuser for directing heated air to the windscreen for demisting, second exhaust deflection means in said lower ventilation diffuser for directing the air flow therefrom, and a force circulation ventilator located within said rear compartment.

2. An air conditioning system according to claim 1, wherein said cowl, intermediate compartment, and heater extend substantially the entire width of said firewall.

3. An air conditioning system according to claim 1, wherein said means for controlling the proportion of air through said ducts comprises fixed and movable shutters controlled from an instrument panel.

4. An air conditioning system according to claim 1, wherein said upper ventilation diffuser consists of a transverse frame structure of elongated configuration comprising a series of slots disposed at the bottom of said windscreen, each said slot having mounted therein a pivoting shutter adapted to be positioned manually for delivering the flow of heated air issuing from said slot either toward the windscreen, toward the vehicle's occupants, or for stopping said flow.

5. An air conditioning system according to claim 1, wherein said lower ventilation diffuser consists of a pair of through-like sections which are controlled by means of shutters responsive to control means mounted on an instrument panel.

6. An air conditioning system according to claim 1, wherein said force circulation ventilator comprises a draw fan and an exhaust port, said fan drawing air through said air conditioning system and rear compartment and exhausting it from said vehicle through said exhaust port.

7. An air conditioning system according to claim 6, wherein said force circulation ventilator is mounted towards the rear of said rear compartment.

References Cited by the Examiner

UNITED STATES PATENTS 2,738,718   3/56   Reynolds _____ 98—2.4
2,867,238   1/59   Wilfert _____ 98—2.4

MEYER PERLIN, *Primary Examiner.*

ROBERT A. O'LEARY, *Examiner.*